United States Patent

Mino

[11] Patent Number: 5,316,263
[45] Date of Patent: May 31, 1994

[54] SYSTEM FOR CONTROLLING ELECTRONIC EXPANSION VALVE PROVIDED IN REFRIGERATING MACHINE

[75] Inventor: Yoshihito Mino, Shizuoka, Japan

[73] Assignee: Kabushiki Kaisha Toshiba, Kawasaki, Japan

[21] Appl. No.: 997,784

[22] Filed: Dec. 29, 1992

[30] Foreign Application Priority Data

Mar. 12, 1992 [JP] Japan .................. 4-053843

[51] Int. Cl.$^5$ .................. F16K 31/02; G05B 11/00
[52] U.S. Cl. .............. 251/129.05; 236/78 C; 318/601; 318/685
[58] Field of Search .............. 251/129.05; 236/678 C; 91/362; 318/601, 685, 653, 696

[56] References Cited

U.S. PATENT DOCUMENTS

| | | | |
|---|---|---|---|
| 3,842,331 | 10/1974 | Hendrickson et al. | 318/601 |
| 4,677,925 | 7/1987 | Murahami et al. | 112/266.1 |
| 4,914,566 | 3/1990 | Steutermann | 251/129.05 |

FOREIGN PATENT DOCUMENTS

| | | |
|---|---|---|
| 0024531 | 3/1981 | European Pat. Off. . |
| 0346764 | 12/1989 | European Pat. Off. . |
| 62-281795 | 12/1987 | Japan . |
| 2201262 A | 8/1988 | United Kingdom . |

*Primary Examiner*—William E. Wayner
*Attorney, Agent, or Firm*—Foley & Lardner

[57] ABSTRACT

It is possible to accurately and easily detect an abnormality in an electronic expansion valve without cutting or separating an electronic expansion valve from a cooling medium circuit. When an excitation pulse current from a drive circuit is output, a magnet rotor of an electronic expansion valve rotates. A hall element detects the position change of the magnet rotor at this time as detection pulses. The number of the detection pulses at this time is sent to a first up-down counter via an amplifier and a rectifier and is counted. The number of excitation pulses is also counted by a second up-down counter. The abnormality detection element judges that there is normal operation when the two count numbers of the first and second counters are in agreement, and that there is an abnormality when the two are not in agreement.

11 Claims, 8 Drawing Sheets

SYSTEM FOR CONTROLLING ELECTRONIC EXPANSION VALVE PROVIDED IN REFRIGERATING MACHINE

BACKGROUND OF THE INVENTION

The present invention relates to an apparatus for detecting abnormalities in an electronic expansion valve incorporated into a medium pipe for a refrigerating machine of an air conditioner or refrigerator or the like.

Figure 1:
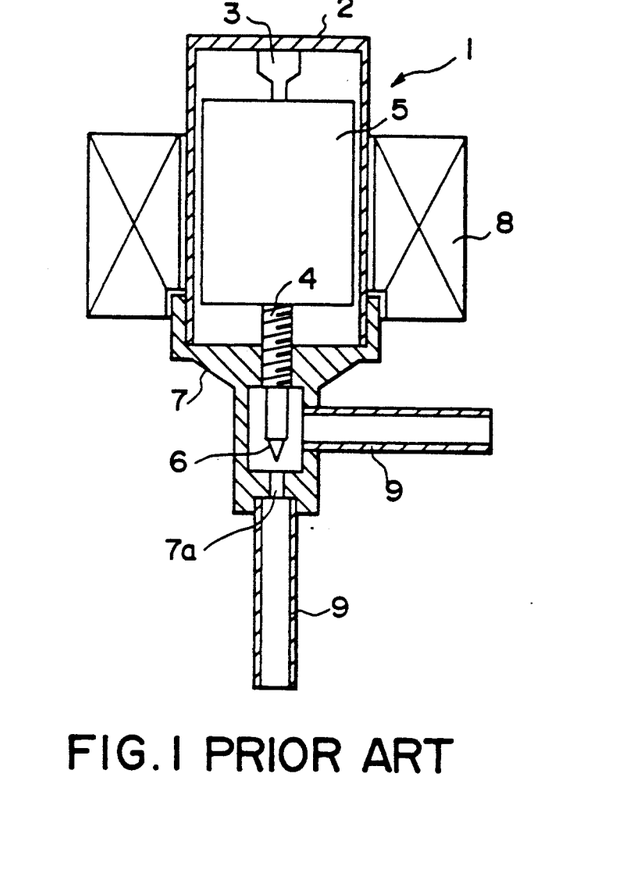
FIG. 1 is a sectional view showing the configuration of a conventional electronic expansion valve.

FIG. 1 is a longitudinal sectional view showing the general configuration of an electronic expansion valve. In this figure, the electronic expansion valve 1 is configured from a cylindrical body 2, a magnet rotor 5 which is supported by a support rod 3 and a feed screw 4 inside the cylindrical body 2, a needle valve 6 which is attached to the lower end of the magnet rotor 5 and which passes through the inner side of the feed screw 4, a mounting base 7 which supports the cylindrical body 2, and a exciter coil 8 which is arranged to the outer side of the cylindrical body 2. A coolant pipe 9 is attached to the mounting base 7. In addition, to the mounting base 7 is formed an orifice 7a and the needle valve 6 is arranged so as to face the orifice 7a.

Figure 2:
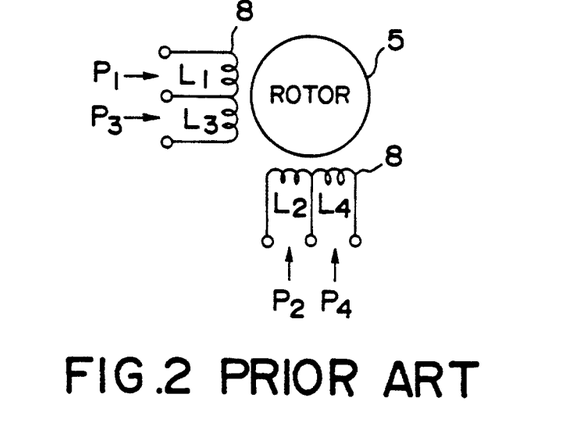
FIG. 2 is a view describing the position relationship between ab excitater coil and a magnet rotor of FIG. 1.
Figure 3:
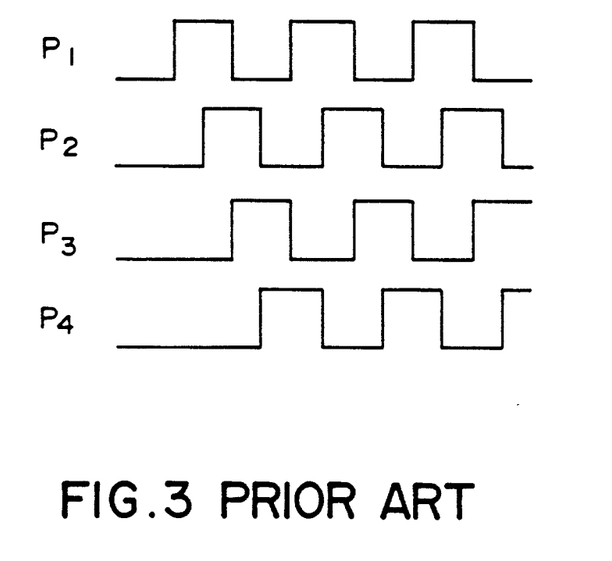
FIG. 3 is a time chart showing the displacement of phase of excitation pulse currents $P_1$-$P_4$ in FIG. 2.

FIG. 2 is a view describing the position relationship between the magnet rotor 5 and the exciter coil 8 which configure a stepping motor. The exciter coil 8 is configured by the four coils $L_1-L_4$ and the pulse currents $P_1-P_4$ are successively supplied to these coils. FIG. 3 is a waveform diagram showing the displacement of the phases of these pulse currents $P_1-P_4$ at this time.

In this manner, the coils $L_1-L_4$ are successively supplied by the pulse currents $P_1-P_4$ so that the magnet rotor 5 is rotationally driven in a stepwise manner. This rotational drive raises and lowers the needle valve 6 with respect to the orifice 7a, and performs adjustment of the degree of opening. This is to say that the amount of cooling medium which flows inside the coolant pipe 9 is controlled.

By the way, when the angle of opening of the needle valve 6 is adjusted so as to perform control of the amount of cooling medium, the needle valve 6 must be first lowered to the closed position, and several excitation pulses then given in the direction of opening of the exciter coil 8 so that the degree of opening of the needle valve 6 can be determined.

However, the degree of opening of the needle valve 6 determined in this manner is based on the assumption that the needle valve 6 is being driven to a position which corresponds to the number of excitation pulses and is not determined on the actual position which is detected for the needle valve 6. This creates a problem for detecting the actual position of the needle valve 6 when the electronic expansion valve 1 is incorporated into the coolant pipe 9 which is sealed.

Accordingly, when it is assumed that there is some sort of abnormality in the electronic expansion valve 1 since cooling medium flow control is not being performed well, it is necessary to cut the coolant pipe 9 and to separate the electronic expansion valve 1 and to confirm the actual action of the needle valve 6 with respect to the number of pulses.

However, when the electronic expansion valve 1 is re-incorporated, there is also the troublesome work of welding the coolant pipe 9 and injecting the cooling medium gas and so finding an abnormality in the electronic expansion valve 1 means much unnecessary work and expense.

SUMMARY OF THE INVENTION

In the light of these problems, the present invention has as an object the provision of an electronic easily and accurately detect abnormalities in an electronic expansion valve and without requiring separation from the cooling circuit.

As one means of solving the problem described above, the present invention is an electronic expansion valve control apparatus for a refrigerating machine and which is comprised of an electronic expansion valve incorporated into a coolant pipe, with the electronic expansion valve have a magnet rotor rotationally driven stepwisely by an excitation pulse current which is output to an excitation coil arranged on the outer side of a cylindrical body in which the magnet rotor is housed, so that adjustment of a degree of opening or closing of the valve mounted inside the magnet rotor is performed by the rotational drive, and is characterized in being provided with a magnet pole position detection means which is arranged to an outer side of the cylindrical body and which outputs detection pulse signals in accordance with a change in position of a pole formed on the magnet rotor, a detection pulse measurement means which measures a number of detection pulses from the magnet pole position change detection means, an excitation pulse number measurement means which measures a number of excitation pulses output to the excitation coil, and abnormality judgment means which judges an operational abnormality of the electronic expansion valve by comparison of each measured value from the detection pulse number measurement means and the excitation pulse number measurement means.

In the configuration described above, when adjustment of the degree of opening of the valve is performed, an excitation pulse current is supplied to the magnetic coil. The number of excitation pulses at this time is measured by the excitation pulse measurement means. Then, the electromagnetic force which is generated between the excitation coil and the magnet magnetic pole position change detection means detects the step change in of the magnetic pole formed to the magnet rotor, and outputs detection pulse signals in accordance with that change of position. The detection pulse number measurement means measures the number of detection pulses at this time.

The abnormality judgment means compares the measured values for the detection pulse number and the excitation pulse number and judges that there is normal operation when the two are in agreement, and that there is an abnormality when the two differ by more than a required value.

As has been described above, according to the present invention, the configuration is provided with a magnet pole position change detection means on the outside of a cylindrical body which houses a magnet rotor and it is possible to detect the actual rotation of the magnet rotor, thereby making it possible to have the simple and accurate detection of abnormalities in an electronic expansion valve and without requiring separation from the cooling circuit.

DETAILED DESCRIPTION OF THE PREFERRED EMBODIMENTS

The following is a description of embodiments of the present invention, with reference to FIG. 4 through FIG. 11. However, those portions which correspond to elements of the configuration shown in FIG. 1 through FIG. 3 are indicated with corresponding reference numerals, and the corresponding descriptions of them are omitted.

Figure 5:
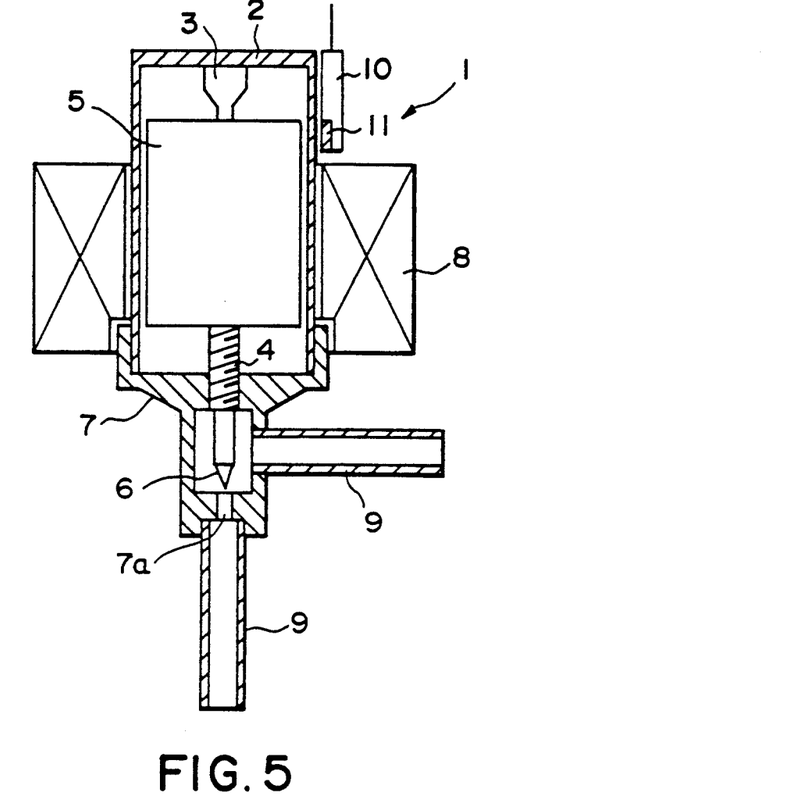
FIG. 5 is a longitudinal sectional view showing the configuration of the electronic expansion valve of FIG. 4.

FIG. 5 is a longitudinal sectional view showing the configuration of the electronic expansion valve relating to a first embodiment of the present invention. To an outer side of a cylindrical body 2 is provided a, hall element 11 as the magnet, pole position change detection means. This hall element 11 is mounted to a support member 10. The other portions of the configuration are substantially the same as those of FIG. 1.

Figure 6:
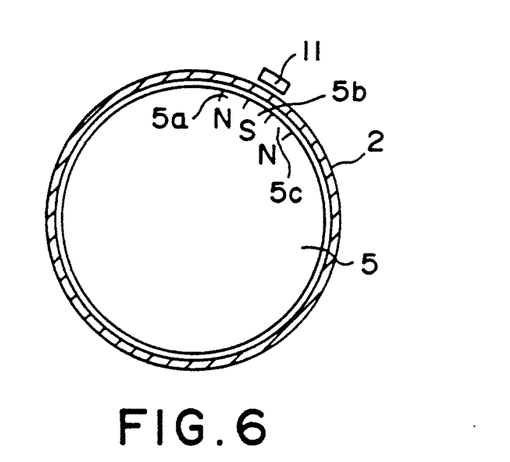
FIG. 6 is a lateral sectional view showing the position relationship between a hole element and a magnet pole formed in a magnet rotor of FIG. 5.

FIG. 6 is a lateral sectional view showing the position relationship between the hall element 11 and magnetic poles 5a, 5b, 5c, . . . formed in a magnet rotor 5 of FIG. 5. As is clear from this figure, the stepwise rotation of the magnet rotor 5 causes the hall element 11 to detect the change in position of the magnetic poles 5a, 5b, 5c, . . .

Figure 7:
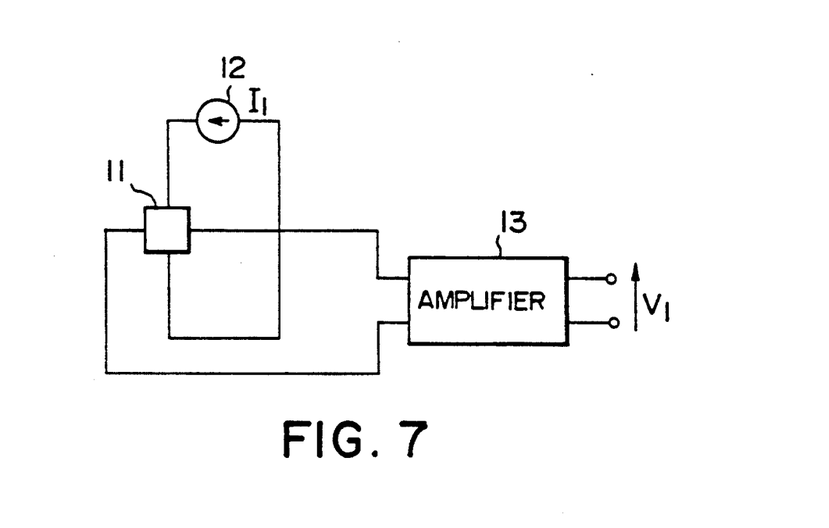
FIG. 7 is a view showing the configuration of a detection signal generation circuit for obtaining the detection pulse signals from the hole element of FIGS. 4-6.
Figure 8:
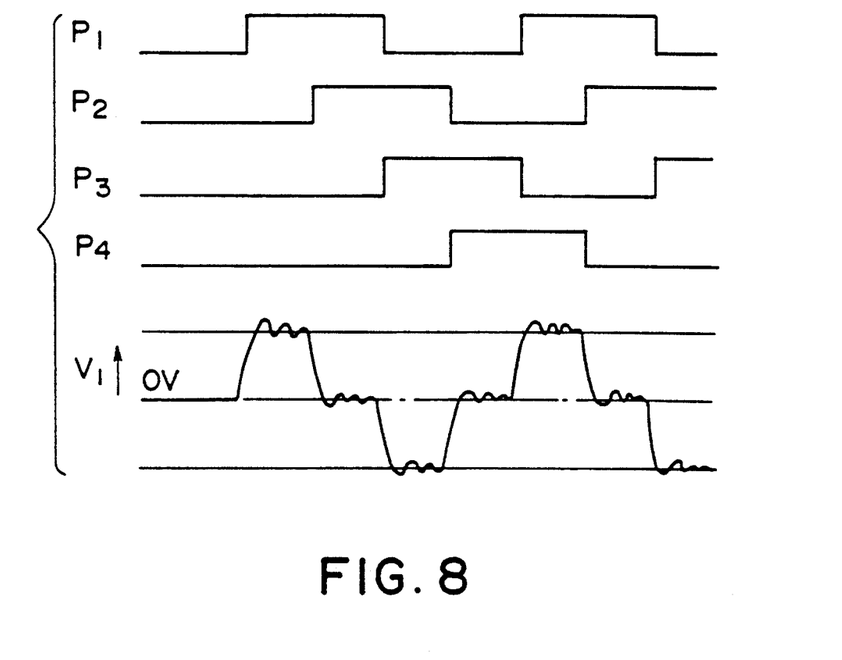
FIG. 8 is a time chart showing the correspondence between the temporal change of the excitation pulse currents $P_1$-$P_4$ and a voltage signal $V_1$ in FIG. 7.

FIG. 7 is a view showing the configuration of a detection signal generation circuit 20 for obtaining the detection pulse signals from the hall element 11. More specifically, a constant current $I_1$ is supplied from a constant current source 12 to the hall element 11 and the change in the magnetic field due to the change in the position of the magnetic poles 5a, 5b, 5c, . . . generates a hall electromotive force in the hall element 11. An amplifier 13 amplifies the change in voltage at this time and outputs the voltage signals $V_1$.

Figure 4:
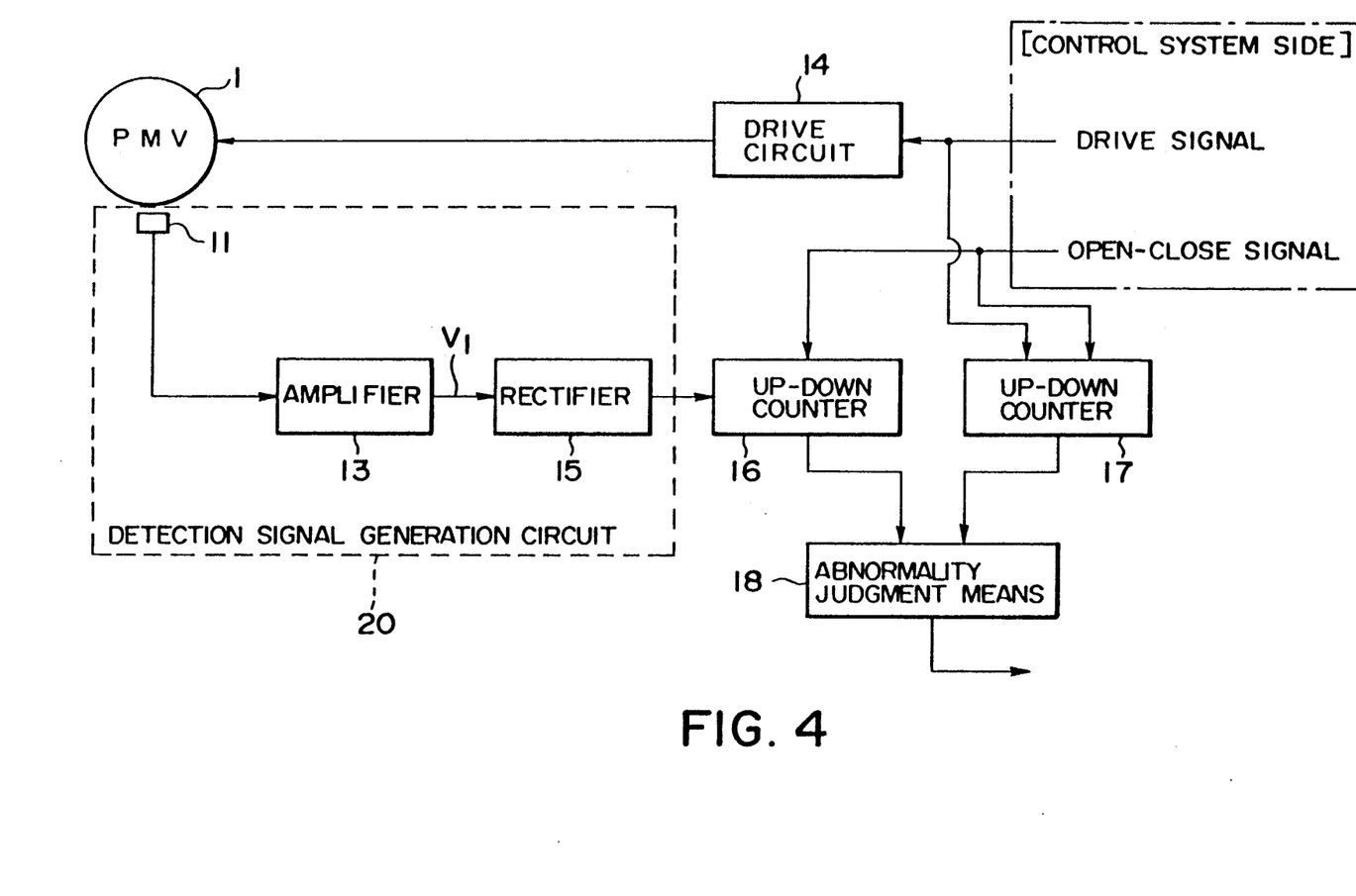
FIG. 4 is a block diagram showing the configuration of a first embodiment of the present invention.

FIG. 4 is a block diagram showing the configuration of the first embodiment used in the electronic expansion valve 1 and the detection signal generation circuit 20 described above. In this figure, a drive circuit 14 uses the drive signals from a control system side as the basis for the supply of an excitation pulse current to the exciter coil of the electronic expansion valve 1. By this, the magnet rotor of the electronic expansion valve 1 rotates and the position change of the magnet pole generates a hall excitation current in the hall element 11.

The amplifier 13 amplifies the hall electromotive force and outputs a voltage signal $V_1$ obtained, and a rectifier 15 rectifies the voltage signal $V_1$ to generate a pulse signal and outputs the pulse signal $V_1$ to a first up-down counter 16 as a detection pulse measurement means. The up-down counter 16 uses an open-close signal from the control system side as the basis for determining whether to count up or count down for the detection pulse number from the rectifier 15. Accordingly, the contents of the register of the up-down counter 16 are a count number corresponding to the amount of magnet rotor drive of the electronic expansion valve 1.

A second up-down counter 17 also inputs the open-close signal and the drive signal from the control system side as the excitation pulse number measurement means, and counts the number of pulses supplied to the excitation coil of the electronic expansion valve 1 as an addition or subtraction pulse number, that is, as a cumulative excitation pulse number.

Then, the count numbers of the up-down counter 16 and the up-down counter 17 are input to abnormality judgment means 18. The abnormality judgment means 18 judges that there is normal operation when the two count values are in agreement, or when the difference between them is within a certain range, and judges that there is an abnormality when the difference between them exceeds a certain range and outputs an abnormality judgment signal. This abnormality judgment signal is sent to the side of the control system, which then performs suitable processing such as abnormality display and stop of operation and the like.

According to the abnormality detection apparatus shown in FIG. 4, it is possible to judge whether the operation is normal or abnormal without cutting the electronic expansion valve 1 from the coolant pipe 9. Accordingly, the specific work for the place of abnormality in the cooling medium circuit is much easier than the conventional case when the cooling medium control is not being performed well.

Figure 9:
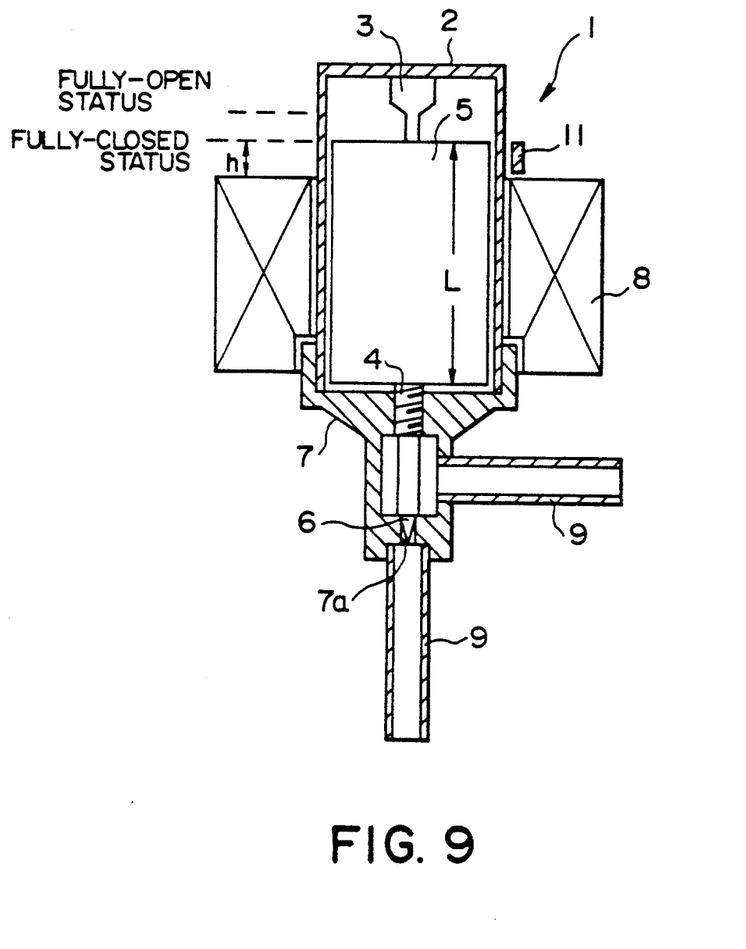
FIG. 9 is a longitudinal sectional view relating to a nsecond embodiment of an electronic expansion valve of the present invention, for describing the desirable height of the magnet rotor.

As shown in FIG. 9, the electronic expansion valve relating to a second embodiment of the present invention has a larger dimension for the length L of the magnet rotor 5 than does a conventional valve and it is desirable that the height of the upper end surface of the magnet rotor 5 when the needle valve 6 is fully closed is higher than the height of the upper end surface of the exciter coil 8 by the height h and that the hall element 11 be arranged within the range of this height h.

Figure 10:
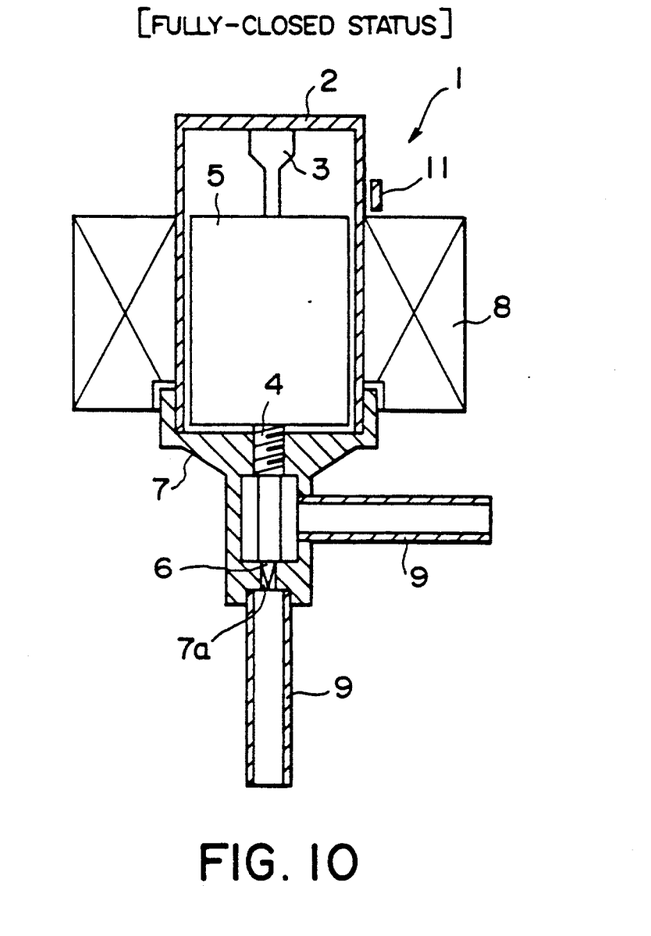
FIG. 10 is a longitudinal sectional view when there is the fully closed status for when the hole element is attached to the electronic expansion valve.
Figure 11:
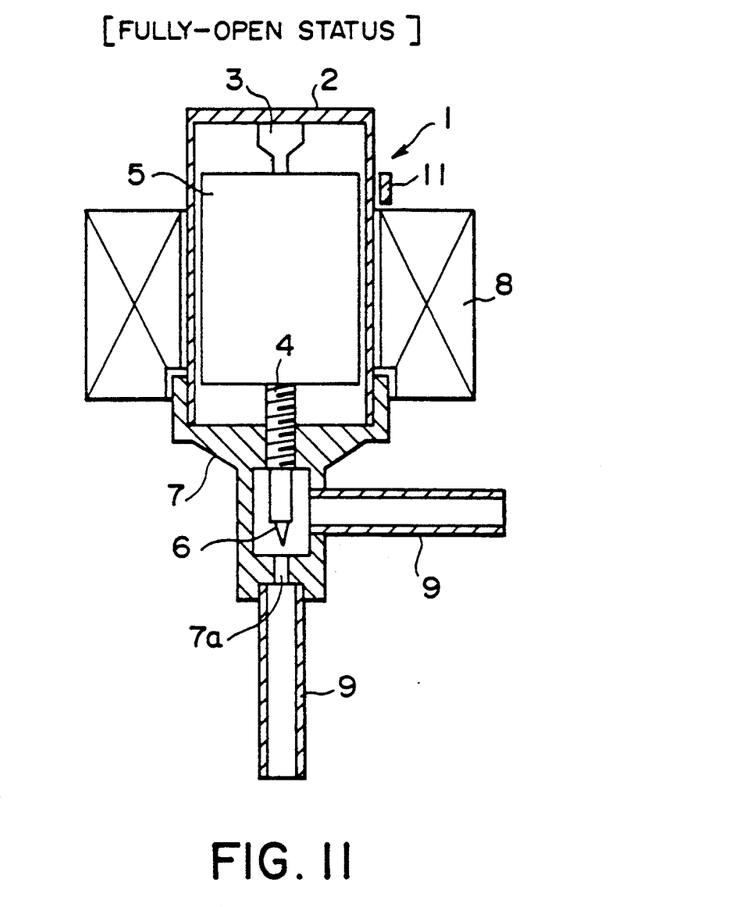
FIG. 11 is a longitudinal sectional view when there is the fully open status for when the hole element is attached to the electronic expansion valve.

On the other hand, FIG. 10 and FIG. 11 are longitudinal sectional views when there is the fully closed status for when the hall element 11 is attached to the electronic expansion valve 1 having a magnet rotor 5 the same length as the conventional valve, with FIG. 10 showing the status when there is the fully closed status and FIG. 11 showing the status when there is the fully open status. As is clear from these figures, the upper end surface of the magnet rotor 5 is positioned below the hall element 11 when there is almost the fully closed status and so it is extremely difficult for the electronic expansion valve 1 to detect the rotation of the magnet rotor 5.

However, with the case of the second embodiment shown in FIG. 9, the magnet pole of the magnet rotor 5 is at a position corresponding to the hall element 11 and so it is possible for the hall element 11 to accurately detect the rotation of the magnet rotor 5 across the entire range from fully closed to fully open.

What is claimed is:

1. An electronic expansion valve control apparatus for a refrigeration machine comprising:

an electronic expansion valve incorporated into a coolant pipe, wherein the electronic expansion valve ha a magnet rotor rotationally driven stepwisely by an excitation pulse current which is output to an excitation coil arranged on an outer side of a cylindrical body in which the magnet rotor is housed, and wherein the cylindrical body is combined with a mounting base to form a single body and a feed screw is accommodated in said cylindrical body and said mounting base such that the feed screw is not exposed to the outside of said single body, whereby adjustment of a degree of opening or closing of the valve mounted inside the magnet rotor is performed by the rotational drive of said magnet rotor;

magnet pole position change detection means which is arranged to the outer side of said cylindrical body for outputting detection pulse signals in accordance with a change in position of a pole formed on said magnet rotor, said magnet pole position change detection means including a hall element configured such that a strength of an electric field as an electric signal is detected by a hall effect;

detection pulse measurement means for measuring a number of pulses of said detection pulse signals from said magnet pole position change detection means;

excitation pulse number measurement means for measuring a pulse number of excitation pulse outputted to said excitation coil; and abnormality judgement means for judging an operational abnormality of said electronic expansion valve by comparison of each measured value form said detection pulse measurement means and said excitation pulse number measurement means.

2. The electronic expansion valve control apparatus according to claim 1, wherein said detection pulse measurement means comprises a first up-down counter which determines whether to count up or count down for said number of pulses of said detection pulse signals which are outputted from said magnet pole position change detection means, on the basis of an open-close signal which is supplied from a control system side.

3. The electronic expansion valve control apparatus according to claim 1, wherein said excitation pulse number measurement means comprises a second up-down counter which counts a number of cumulative excitation pulses generated by an addition or subtraction of said excitation pulse number which is supplied to said excitation coil of said electronic expansion valve, on the basis of a drive signal and an open-close signal which is supplied from a control system side.

4. The electronic expansion valve control apparatus according to claim 1, wherein said control apparatus comprises:

a hall element which is provided with said outer side of said cylindrical body and for outputting said detection pulse signals corresponding to said position change of said magnet pole formed on said magnet rotor;

a first up-down counter which measures said number of pulses of said detection pulse signals from said hall element;

a second up-down counter which measures said pulse number of said excitation pulse signals outputted to said exciter coil;

said abnormality judgment means which judges an abnormality of said electronic expansion valve when a comparison result is included in a predetermined status after comparison of both of counted numbers from said first and second up-down counters.

5. The electronic expansion valve control apparatus according to claim 4, wherein said abnormality judgment means comprises in the manner of judging said abnormality when both of said counted numbers of said first and second up-down counters have a displacement more than a predetermined range, and of judging a normality when both of said counted numbers of said first and second up-down counters coincide with each other and when said displacement between both of said counted numbers is in said predetermined range.

6. The electronic expansion valve control apparatus according to claim 4, wherein said control apparatus further comprises:

an amplifier for outputting a voltage signal which is generated by amplifying a hall electromotive force as said detection pulse signals which are outputted from said hall element; and a rectifier for outputting a pulse signal which is generated by rectifying said voltage signal which is outputted from said amplifier.

7. The electronic expansion valve control apparatus according to claim 6, wherein said hall element, said amplifier and said rectifier comprise a detection signal generation circuit.

8. The electronic expansion valve control apparatus according to claim 4, further comprising a drive circuit which supplies an excitation pulse current to said exciter coil of said electronic expansion valve corresponding to a drive signal from control system side, and which causes said magnet rotor of said electronic expansion valve to rotate by the supply of said excitation pulse signal, thereby generating a hall electromotive force in said hall element by a position change of said magnetic pole of said magnet rotor.

9. The electronic expansion valve control apparatus according to claim 4, wherein said magnet rotor of said electronic expansion valve has a length corresponding to a longitudinal length in an axised direction of said exciter coil which is wound around the outer side of said cylindrical body, and said hall element is provided on the outer side of said cylindrical body and at a position adjacent to an end opposite to a valve body end of said exciter coil.

10. The electronic expansion valve control apparatus according to claim 9, wherein said hall element is mounted by a supporting member which is fixed to a portion of said outer side of said cylindrical body and adjacent to said end opposite to said valve body end.

11. The electronic expansion valve control apparatus according to claim 4, wherein
said magnet rotor of said electronic expansion valve is formed in the manner of having a predetermined length longer than a longitudinal length in an axised direction of said exciter coil which is wound around the outer side of said cylindrical body, and said hall element is provided on the outer side of said cylindrical body and within a range of said predetermined length.

* * * * *